J. H. ELWARD,

Assignor, by mesne assignments, to the ST. PAUL HARVESTER WORKS.

HARVESTER.

No. 9,893. Reissued Oct. 18, 1881.

Attest:
R. F. Barnes.
D. P. Cowl

Inventor:
John H Elward
by H A Doubleday

N. PETERS, Photo-Lithographer, Washington, D. C.

UNITED STATES PATENT OFFICE.

JOHN H. ELWARD, OF STILLWATER, ASSIGNOR, BY MESNE ASSIGNMENTS, TO THE ST. PAUL HARVESTER WORKS, OF ST. PAUL, MINNESOTA.

HARVESTER.

SPECIFICATION forming part of Reissued Letters Patent No. 9,893, dated October 18, 1881.

Original No. 113,990, dated April 25, 1871; Reissue No. 6,359, dated March 30, 1875. Application for reissue filed March 31, 1879.

*To all whom it may concern:*

Be it known that I, JOHN H. ELWARD, of Stillwater, in the county of Washington and State of Minnesota, have invented certain new and useful Improvements in Harvesters; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
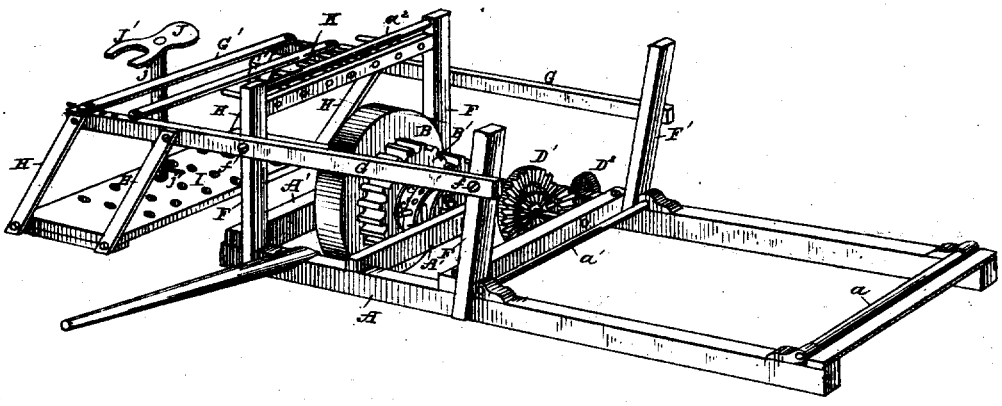
Figure 2:
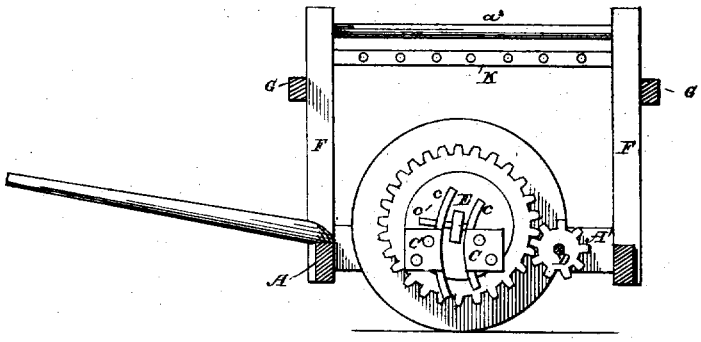
Figure 3:
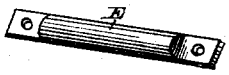
Figure 4:
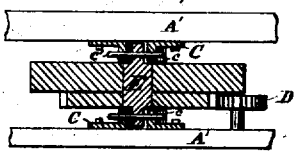

Figure 1 is a perspective view of a harvesting-machine embracing my improvements. Fig. 2 is a vertical longitudinal section of the main frame at the inner side of the driving-wheel. Fig. 3 is a perspective view of the main drive-wheel axle, detached; and Fig. 4 is a horizontal section of the main drive-wheel, its supports and its driving-pinion, taken on line *x y*, Fig. 2.

Similar letters of reference denote corresponding parts in all the figures.

My invention consists, first, in a novel construction and arrangement of the binders' platform and binders' seat or support, the former being suspended from overhanging bars or supports, and the latter being made adjustable to various positions, for adapting them more perfectly to the character of the work, and to permit the binders to assume such positions relative to the work to be accomplished as experience or convenience may dictate.

The second part of my invention relates to a novel construction of devices which are employed for supporting the frame upon the main drive-wheel in such a manner that said frame can be elevated and supported above the drive-wheel axle, the object of this construction being to facilitate the reduction in the width of the machine by increasing the height from the ground at which the grain is cut, as will be hereinafter fully explained.

The invention consists, thirdly, in a novel construction of and manner of applying and adjusting the drive-wheel axle, whereby it is made to serve as a rigid bar of the main frame, for stiffening and strengthening the same, while at the same time it is made the means of adjusting the height of the frame, as hereinafter described.

To enable others to construct and use my improvements, I will proceed to describe the same with reference to the drawings, in which—

A represents the frame of the machine, B the main ground-wheel, and B′ the driving spur-wheel secured thereto.

The manner of mounting the drive-wheel in the frame is as follows:

A′ A′ are longitudinal bars of the main frame, between which the driving-wheel is placed, and the adjacent sides of which have secured to them metal bearing-plates C, provided with parallel flanges *c c*, curved in the arc of a circle of which the pinion-shaft D is the center, said flanges thus forming axle-supports extending above and below the frame-bars A′ and the plates C to any extent desired, to provide for the necessary vertical adjustment of the frame and cutting apparatus to adapt the machine to both reaping and mowing.

E is the drive-wheel axle, the ends of which are squared or flattened and extend within the grooves formed by the curved flanges *c*, and are perforated to receive pins *c′*, passing through said ends and through the flanges *c*, which are also perforated, as shown in Fig. 1, for the purpose of holding the axle at the required point of adjustment. By this construction and manner of securing the axle it is made to constitute a rigid central transverse frame-bar, serving to materially strengthen and stiffen the frame, and to prevent accidental displacement of the axle or gearing.

By an examination of Fig. 4 it will be seen that the girts A′ A′ are at a distance apart a little greater than the length of the main drive-wheel axle E, and that the plates C and supporting-flanges *c* are placed inside these girts—that is to say, between them—so that the flanges *c* are overhung relative to the girts, the result being that the axle can pass vertically through between the girts without its ends coming in contact with said girts or being impeded thereby, this being the first construction of which I have any knowledge that will permit the main drive-wheel axle to pass freely from above that part of the machine to which its supports are attached to a position below that part of the machine to which its supports are attached without disturbing the mesh of the drive-wheel gear, with its driving-pinion, or removing the axle from the drive-wheel.

The pinion-shaft D is provided with a bevel wheel or disk, D′, on the vertical side or face of which are a series (two or more) of concentric rings of cogs or teeth, with either of which a sliding pinion on a driving or crank shaft, $D^2$, may be made to engage, and by means of which the speed of the cutters may be varied to adapt the machine to reaping or mowing, as required.

The frame A is provided with a series of rollers, $a$ $a'$ $a^2$, to accommodate the endless horizontal and inclined apron or aprons which carry the grain to the binders, the last-named of said rollers—viz., $a^2$—being mounted in uprights F of the frame A in a position above and outside of the drive-wheel B.

F′ are additional uprights, attached to frame A at or near the inner end of the cutting apparatus or grain-platform, and near the upper ends of these uprights F F′ are two horizontal transverse bars, G, one in front and the other in rear of the drive-wheel, the outer ends of which bars extend some distance beyond the main frame, overhanging the same on the stubble side, as shown clearly in Fig. 1.

H H are pendent parallel links or rods, pivoted at their upper ends to the overhanging bars G, (two to each,) and I is the platform, suspended on links by a pivotal connection at each of its four corners. By this arrangement the platform may be swung inward toward the frame and lowered by swinging in the arc of a circle, or outward and upward, as may be required to suit the height or convenience of the binders.

Any suitable device may be employed for setting the platform, or it may be allowed to swing freely on links H, as desired.

The bars G are perforated vertically at their overhanging ends to permit the adjustment of longitudinal bars G′, constituting supports for the binders, as explained in Patent No. 104,290, issued June 14, 1870, and the attachment of said bars G to uprights F F′ is made by a single bolt, $f$, in each, so that by removing the bolts from uprights F′ the bars G, together with the links H and platform I, may be folded up into a vertical, or nearly vertical, position for transportation, or for passing through gates.

The bars G may be made of any suitable material; but I prefer, ordinarily, that they shall be slightly flexible or elastic, to give greater ease to the operator on the platform.

The platform is perforated, as shown in Fig. 1, to receive binders' seats J, either additional to the bars G′ or as a substitute therefor. These seats J are mounted on standards $j$, and, in addition to the seat part J, are provided with a fork, J′, or table, upon which the grain may be bound after removing it from the receptacle K, where it is deposited by the discharging-apron.

The standard $j$ is perforated at various heights to receive pins or stirrups $j'$, to accommodate the foot or limb of the operator.

The object of this last-described construction of support for the binder is to provide for the want felt by many of our farmers who suffered loss of limb during the war, and who are unable to do the work of binding by reason only of their inability to stand or ride upon the machine as heretofore constructed.

The construction herein described affords a seat, J, a table, J′, and a support or stirrup, $j'$, in which to rest the disabled limb, thereby enabling the class of persons referred to to do the work equally well with those upon whom the farming community have heretofore been entirely dependent.

From the above description it will be seen that in cutting very tall grain the machine may be raised to some distance above the main axle without disturbing the relation of the gearing, this result being attained by constructing the plates C with flanges curved in the arc of a circle and extending below the frame-bars A A′, in combination with the driven pinion D, about which the axle and driving-wheel vibrate in the arc of a circle the center of which is the driven pinion D; and it will be seen that by thus raising the machine above the highest point at which it is possible to support other machines of this class I can cut and elevate tall grain without correspondingly increasing the width of the machine, this method of operation or result being exactly the reverse of that which is obtained in machines as ordinarily constructed—that is to say, so provided with axle-supports which project only above the gear-plank or girt to which such supports are attached, so that cutting apparatus and the upper surface of carrier in its rear can be lowered relative to the driving-wheel axle for the purpose of cutting short grain or picking up down grain, it being apparent that this lowering or tilting of a machine as ordinarily built does not interfere with elevating the grain in the same way that cutting very tall grain does, because short or down grain does not extend too far rearward upon the horizontal carrying-apron; but by use of my invention I am enabled to cut grain of much greater height than can be cut upon a machine in which the cutting apparatus and the upper surface of the carrier in its rear cannot be raised above the axle, from the fact that in case the machine be raised to only the ordinary height tall grain will be cut of such length that the heads will project beyond the rear edge of the endless horizontal apron to such distance as to materially interfere with the operation of elevating the grain and delivering it to the binders' table.

Wherever in this specification the cutting apparatus and the upper surface of the carrier in its rear are referred to as being supported above the axle I mean that these parts are supported above the horizontal plane of the main drive-wheel axle when they are in a horizontal position.

Parts of the machine not specifically referred to may be constructed in any usual manner.

Having now described my invention, what I claim as new, and desire to secure by Letters Patent, is—

1. The binders' platform I, suspended from the transverse overhanging bars G, supported by the main frame, substantially as described.

2. The movable binders' seat J, provided with the fork J′ and stirrup *j*, in combination with the binders' stand or platform, as described.

3. In a harvesting-machine, the combination, with the main frame, which supports an elevator for elevating the grain over the main drive-wheel, of a main drive-wheel, B′, having its axle E mounted in flanges *c c*, forming arcs of circles which extend both above and below the main frame, and are concentric to a pinion meshing with said wheel, and means for supporting the machine at any desired height either above or below the main axle, substantially as set forth.

4. The main drive-wheel axle E, provided with the flattened ends, in combination with the grooved segments or flanges *c*, and the through-pins, for setting the axle at any desired height and for stiffening the frame, as described.

In testimony that I claim the foregoing I have hereunto set my hand.

JOHN H. ELWARD.

Witnesses:

W. S. GOODHUE,

WM. B. DEAN.